(12) United States Patent
Stewart

(10) Patent No.: US 6,301,270 B1
(45) Date of Patent: Oct. 9, 2001

(54) RIGHT TO LEFT MATCHING OF DEVICE ADDRESS NUMBERS WITH PROVIDED INTEGRATED SERVICES DIGITAL NETWORK DESTINATION NUMBERS

(75) Inventor: Douglas E. Stewart, Houston, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/032,866

(22) Filed: Mar. 2, 1998

(51) Int. Cl.[7] .................................................. H04M 1/00
(52) U.S. Cl. ............................................................. 370/522
(58) Field of Search ..................................... 370/522, 524, 370/420, 392, 401; 379/199, 100.14, 93.02, 127, 211

(56) References Cited

U.S. PATENT DOCUMENTS

| | | | |
|---|---|---|---|
| 4,961,186 | * 10/1990 | Chandramouli et al. | 370/264 |
| 5,400,335 | * 3/1995 | Yamada | 370/524 |
| 5,595,606 | 1/1997 | Fujikawa et al. | 118/725 |
| 5,598,411 | * 1/1997 | Matsukawa | 370/352 |
| 5,614,026 | 3/1997 | Williams | 118/723 ME |
| 5,665,640 | 9/1997 | Foster et al. | 438/680 |
| 5,946,390 | * 9/1999 | Boakes | 379/355 |

FOREIGN PATENT DOCUMENTS

| | | |
|---|---|---|
| 714998-A2 | 6/1996 | (EP). |
| 818558-A1 | 1/1998 | (EP). |
| 5-217902 | 8/1993 | (JP). |

OTHER PUBLICATIONS

Black, Ulysses, *ISDN & SS7: Architecture For Digital Signaling Networks©*, 1997, pp. 32–38 and 66–88.

Chorafas, Dr. Dimitris N., *Local Area Network Reference©,,* 1989, pp. 50–54.

Tannenbaum, Andrew S., *Computer Networks©*, 1988, pp. 90–109.

* cited by examiner

*Primary Examiner*—Douglas Olms
*Assistant Examiner*—Ken Vanderpuye
(74) *Attorney, Agent, or Firm*—Akin, Gump, Strauss, Hauer & Feld, LLP (57) ABSTRACT

A method and computer system according to the disclosed invention comparing from right to left the ISDN device address embedded within an ISDN message with a pre-existing ISDN device number resident in the computer system. The computer system receives data containing the ISDN device address through the ISDN-type data communication device. Upon receiving the data, the computer system compares the ISDN device address with the resident ISDN device number contained in the computer system in a right to left matching scheme. If the ISDN device address and ISDN device number match using the right to left matching scheme, the computer system responds to the ISDN message through the ISDN-type data communication device.

18 Claims, 10 Drawing Sheets

RIGHT TO LEFT MATCHING OF DEVICE ADDRESS NUMBERS WITH PROVIDED INTEGRATED SERVICES DIGITAL NETWORK DESTINATION NUMBERS

BACKGROUND OF THE INVENTION

1. Field of the Invention

The present invention relates to Integrated Services Digital Network (ISDN) addressing, and more particularly to matching to matching ISDN destination numbers with the seven digit address number provided in the ISDN set-up packet.

2. Description of the Related Art

Computers are becoming increasingly important in many aspects of life, including homes and businesses. As computers become more important, more advances in computer capabilities are developed. One area of advancement in communication capabilities. The easier, quicker, and cheaper a computer can access data, the greater the desirability. Computers can access data through numerous media, including through telephone lines.

Originally, telephone lines were established to connect customer premises equipment (CPE) (such as a home telephone) to a central switching office of the telephone company. Original telephone lines were based on analog network technology. This technology was primarily voice-oriented and generally only allowed voice traffic transmissions. The analog network technology originally sent control signals over the same communications channel as was used to transmit voice traffic. Tones at various frequencies were used by the system as control signals. This protocol is known as in-band signaling.

Digital technology followed the analog network technology. Digital transmission technology and digital switching capabilities evolved into integrated digital networks (IDN). However, the end-user was generally unaware of any developments as these developments focused on the internal segments of the networks.

Digital development continued with the creation of out-band signaling. Out-band signaling, also referred to as common channel signaling (CCS), implements a scheme for sending control signals over a separate channel. Two types of out-band signaling schemes are available—the physical out-of-band signaling and the physical in-band/logical out-of-band signaling. An example of the latter is the Integrated Services Digital Network (ISDN). Using the ISDN scheme, both control signals and user traffic occupy the same channel. The control signals, however, are allowed only a portion of the channel while the user traffic is allotted the remaining portion.

A driving force in the advancement from analog telephony lines is the desire to access data other that voice traffic. As computer technology has progressed, the communications infrastructure has advanced to compliment newer technology. Modem communication needs of data transmission, facsimile, and video tax the capabilities of the existing analog network. However, the costs of creating a new communications infrastructure are staggering, and few if any entities are prepared to make the initial capital investment necessary to implement such a plan. This conundrum contributed to framing the goals of redesigning the telephone system, both nationally and internationally. This lead to a redesigned advanced digital system, versus the older analog systems, and is entitled the Integrated Services Digital Network (ISDN).

ISDN is designed to provide a uniform digital user network interface (UNI) and to provide a detailed standard for global usage. The ISDN scheme addresses the interface as seen by the end-user. That is the ISDN interface attaches to telephones, computer systems, and Private Branch Exchanges (PBXs). The ISDN scheme does not address how the telephone companies transmit or route the data, but only addresses the format of the data as it leaves the control of the telephone companies. The equipment and protocols implemented by the telephone companies are referred to as the carrier network. ISDN connects to the carrier network through twisted-pair, four wire digital links. ISDN implements time division multiplexing (TDM) to allow for both control signals and voice traffic to occur over the same channel. Several channel types exists:

A—4kHz analog channel;

B—64 kbps digital Pulse Code Modulation (PCM) channel for data or voice traffic;

C—8/16 kbps digital channel;

D—16/64 kbps digital channel for out-of-band signaling;

E—64 kbps digital channel for internal ISDN signaling; and

F—384/1536/1920 kbps digital channel.

A typical ISDN configuration is the Basic Rate Interface (BRI), which consists of two B channels and one D channel. The BRI is usually designated as "2B+D" and is considered a standard to replace the plain old telephone system (POTS). The BRI standard is typically implemented when the ISDN is for home use or for small business operations. The BRI standard allows for the control signals to be transmitted via the D channel at the slower rate, allowing the voice traffic or data transmission to be transmitted via the B channels at the faster, 64 kbps rate. The D channel is sporadically used to transmit control signals, so during periods on non-use, the D channel can be used to transmit voice traffic or data.

When a connection is to be made between the carrier network and an ISDN device, a series of control signals are transmitted to the ISDN device. Each control signal is divided into packets, where each packet defines a parameter of the connection and the attributes of the connection. One packet, "Setup" contains the information necessary to begin the call procedure, including the callee's ISDN telephone number. The callee's ISDN telephone number is provided in the packet as a seven digit number, where this number equates to the telephone number without the area code. The ISDN device matching the number contained in the Setup packet responds with a return signal of Setup Acknowledged. To determine if the answering ISDN device is the intended ISDN device, the answering ISDN device compares the callee's ISDN address number to the ISDN device number resident in the computer system.

This number resident in the computer system is generally entered upon installation of the ISDN device. Currently in the United States, users generally enter the telephone number issued by the local telephone company for their ISDN line as the ISDN device number. Frequently the telephone number entered corresponds to the North American Numbering Plan (NANP). This plan comprises ten digits; the first three digits are commonly referred to as the area code, the next three digits are referred to as the exchange code and are used primarily in switching operations, and the last four digits identify the user line. The ISDN address number, generated by the caller's ISDN device may not contain the entire ten digit telephone number if the call is placed within a given area code. Therefore, when the callee's ISDN device compares the ISDN device address with the resident ISDN device number; the numbers may not match because of the area code. Currently, users are instructed to re-enter the ISDN device number, without the area code, to correct the matching errors. However, as the area codes become increasing important in large metropolitan areas, the necessity of entering the area code increases. Therefore, any advance in the ability of an ISDN device to contact another ISDN device, over multiple area codes, is desirable.

SUMMARY OF THE INVENTION

A method and computer system according to the disclosed invention compares from right to left the ISDN device address embedded within an ISDN message with a pre-existing ISDN device number resident in the computer system. The computer system receives data, the data containing the ISDN device address, through the ISDN-type device. The computer system then compares the ISDN device address with the resident ISDN device number in a right to left matching scheme. If the ISDN device address and ISDN device number match, the computer system responds to the ISDN message. The right to left matching scheme allows the computer system to properly respond to an ISDN message, even when area code numbers are contained in only one of the ISDN device address or the ISDN device number. The computer system does not need to change the ISDN device number to include/remove the area code to receive an ISDN message.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
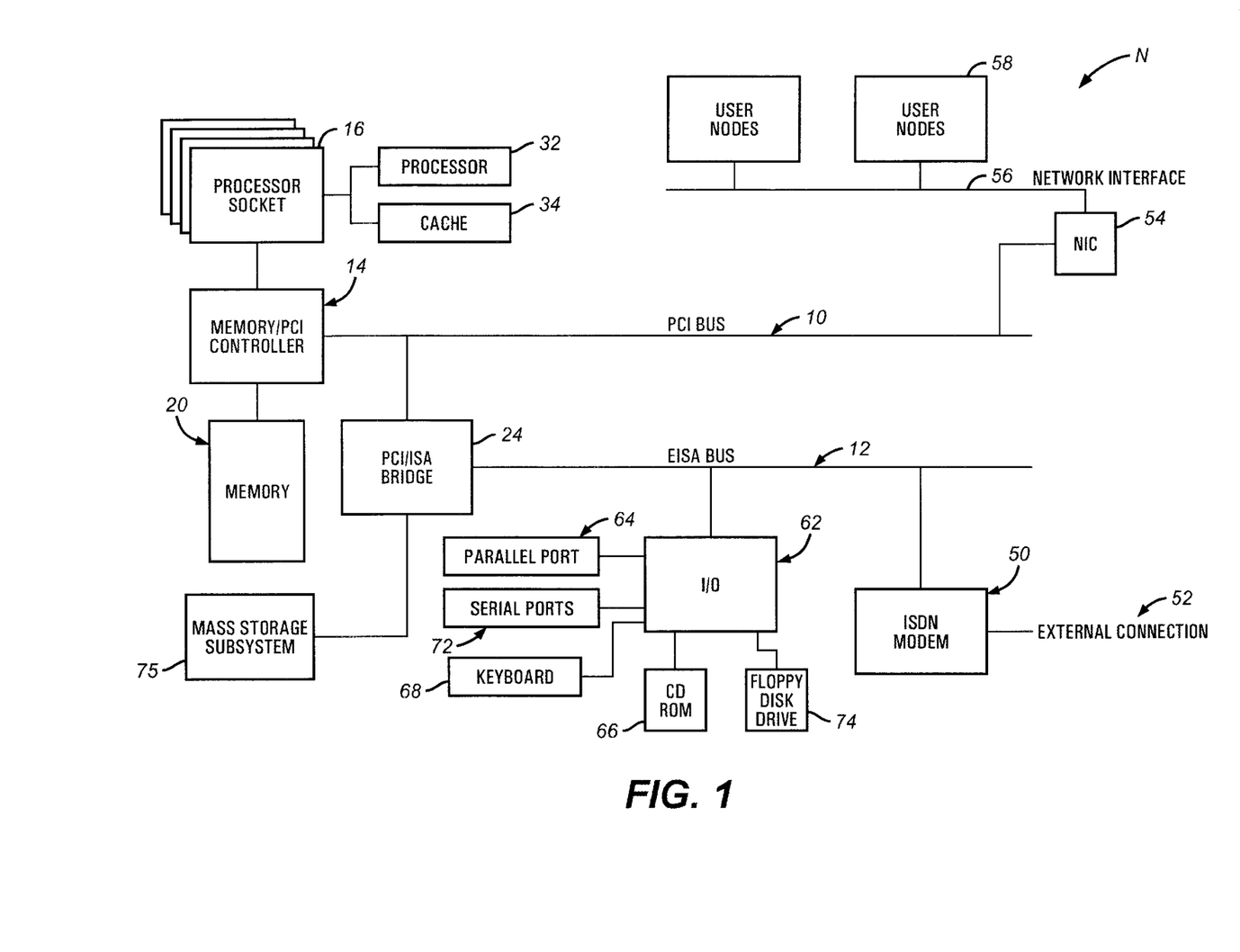
FIG. 1 is a block diagram of the computer system according to the present invention.

Turning to FIG. 1, illustrated is a typical computer system implemented according to the invention. While this system is illustrative of one embodiment, the techniques according to the invention call be implemented in a wide variety of systems including but not limited to a computer server. The computer system in the illustrated embodiment is a PCI Bus/EISA Bus based machine, having a peripheral component interconnect (PCI) bus 10 and an enhanced industry standard architecture (EISA) bus 12. The PCI bus 10 is controlled by PCI controller circuitry located within a memory/PC controller 14. This controller couples the PCI bus to a processor socket 16, via a host bus, and a memory subsystem 20. A second circuit, a PCI/EISA bridge 24 bridges between the PCI bus 10 and the EISA bus 12. The memory/PCI controller 14 is coupled to the processor socket 16. The processor socket 16 includes four separate sockets, each preferably designed to receive a Pentium® Pro-module by the Intel Corporation, which includes a microprocessor core 32 and a cache 34. The memory/PCI controller 14 supports a memory subsystem 20 (or main memory) of extended data out (EDO) dynamic random access memory (DRAM) or synchronous dynamic random access memory (SDRAM), a 64/72 bit data path memory, a maximum memory capacity of four gigabyte, dual inline memory module (DIMM) presence detect, error correcting code (FCC), and 3.3 volt DRAMs.

The PCI/EISA bridge 24 supports the standard server functions, including a direct memory access (DMA) controller, interrupt controllers, a timer, a real time clock, and a static RAM (RPAM). The PCI/EISA bridge 24 is connected to the Mass Storage Subsystem 75. The Mass Storage Subsystem includes a hard disk drive or series of hard disk drives capable of storing hundreds of gigabytes of data. The EISA bus 12 is also coupled to an I/O chip 62. The I/O chip 62 provides a variety of input/output functionality, including a parallel port 64, serial ports 72, a keyboard 68, a CD-ROM 66, and a floppy disk drive 74. These devices are coupled through connectors to the I/O chip 62. The floppy disk drive 74 includes disk drives for 3½ inch and 5¼ inch floppy disk, and advance technology attachment package interface (ATAPI) drives. The EISA bus 12 is also coupled to an integrated services digital network (ISDN)-type modem 50. The ISDN-type modem 50 includes a basic rates interface (BRI) type ISDN modem. A BRI ISDN type device communicates through an interface comprising two "B" channels and one "D" channel (2B+D) the "B" channels of the BRI ISDN type device allow communications at 64 kilobytes per second (kbps) whereas the "D" channel of the BRI ISDN type device allows communication at 16 kbps.

The PCI bus 10 is also coupled to a network interface controller (NIC) 54. The NIC 54 is coupled to a network interface 56. The network interface 56 interfaces with user nodes 58.

Figure 2:
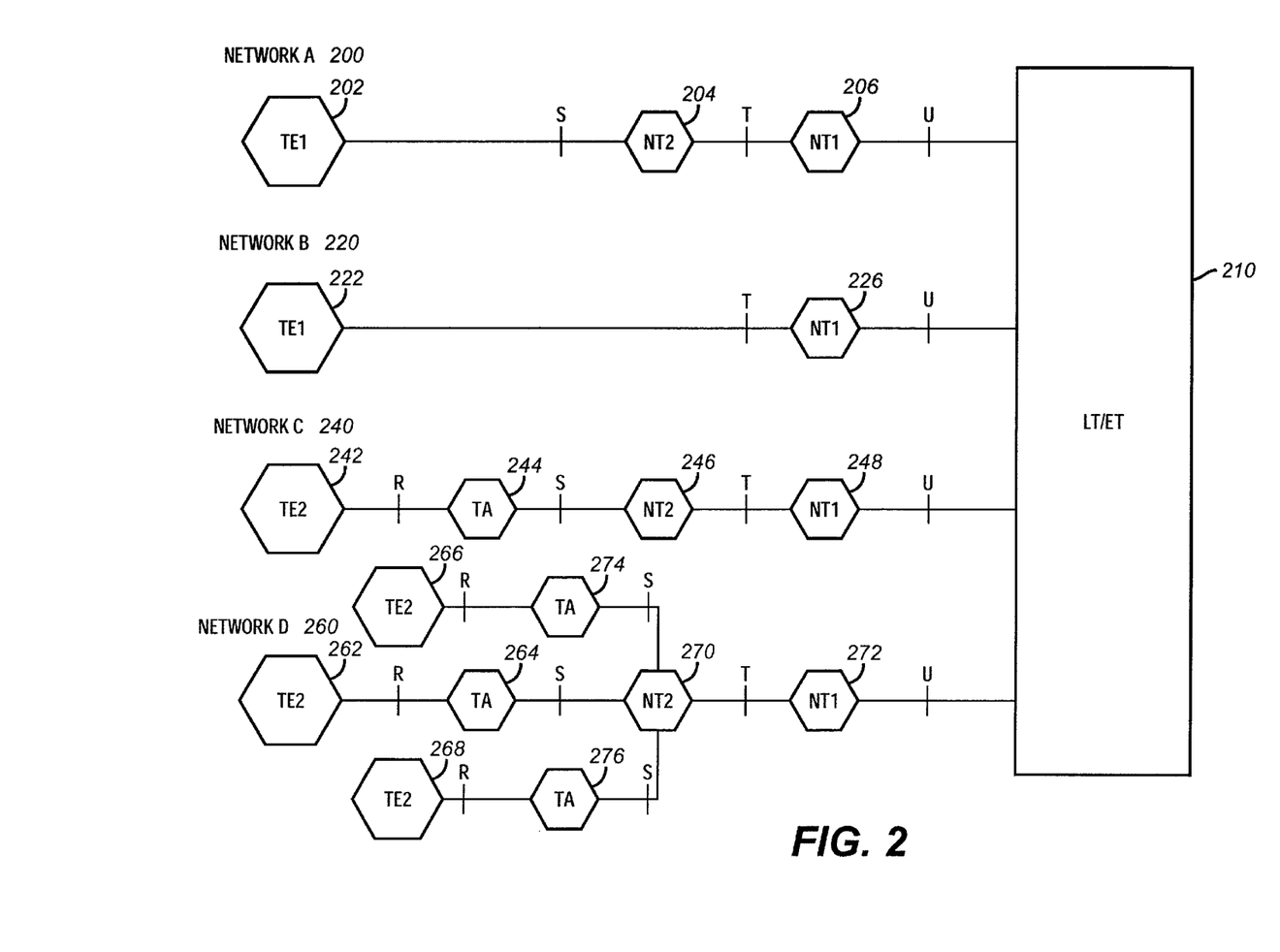
FIG. 2 is a block diagram of an ISDN configuration.

Turning now to FIG. 2, a functional diagram of an ISDN configuration is shown. Four separate network architectures are shown, network A 200, network B 220, network C 240, and network D 260. Network A 200, network B 220, network C 240, and network D 260 are all connected to LT/ET 210. The LT/ET 210 is the line termination (LT) or the exchange termination (ET). This is the functional element that represents the local carrier or local phone company. The ISDN standard only defines the interface from the end-user to the local carrier. How the local carrier transfers data from one user to another is defined in a separate standard. An example of this standard is the Signaling System No. 7 (SS7) which is an out-of-band signaling system for the local exchanges. One end of the ISDN architecture connects to the LT/ET while the other terminates in an ISDN device. In network A 200, the LT/ET 210 is connected to the Network Termination Type 1 (NT1) 206. The NT1 206 is typically placed by the local telephone carrier on the end-users property. The NT1 206 is connected to the LT/ET 210 using the pre-existing telephone lines. The NT1's 206 responsibilities include signal protocol conversion and timing. NT1 226, NT1 248, and NT1 272 are functionally equivalent to NT1 206. The NT1 206 is connected to the Network Termination Type 2 (NT2) 204. Examples of an NT2 204 are a private branch exchange (PBX) and a voice and data switch. The NT2 204 is supplied and maintained by the end-user. An NT2 204 distributes services to other ISDN devices attached to the line and is responsible for the network signaling. The NT2 204 can connect up to eight ISDN devices. NT2 246 and NT2 270 are functionally equivalent to NT2 204. The NT2 204 is connected to the ISDN-ready Terminal Equipment (TE1). An example of a TE1 is an ISDN terminal or ISDN telephone. A TE1 device implements the ISDN protocols and support the ISDN services.

Network B 220 consists of an LT/ET 210, a NT1 226, and TE1 222. The TE1 222 is an ISDN device, capable of implementing the ISDN protocols and supporting the services offered by ISDN. The TE1 222 is directly connected to the NT1 226. This configuration typically is implemented when the ISDN is functioning for a single user or a small business. This configuration is implemented when the end-user desires to only maintain a few ISDN connections at the same time.

Network C 240 consists of an LT/ET 210, a NT1 248, a NT2 246, a TA 244, and a TE2 242. The network is functionally equivalent between the LT/ET 210, NT1 248, and NT2 246 connections as discussed above. The NT2 246 is connected to a terminal adapter (TA) 244. The terminal adapter is present when a non-ISDN device is connected to the ISDN configuration. The TA 244 provides the necessary protocols so that the non-ISDN device can function on the ISDN. The TA 244 is connected to the Terminal Equipment 2 (TE2) 242. Examples of the TE2 242 are analog phones and non-ISDN modems. By connecting to the TA 244, the TE2 242 can function as an ISDN device and connect to the ISDN without the end-user having to replace the TE2 242 with an ISDN device.

Network D 260 consists of an LT/ET 210, a NT1 272, a NT2 270, three TAs 264, 274, and 276, and three TE2s 262, 266, and 268 respectively. The network is functionally equivalent between the LT/ET 210, NT1 272, and NT2 270 connections as discussed above. The NT2 270 is connected to multiple TAs 264, 274, and 276 which are connected to TE2s 262, 266, and 268 respectively. The NT2 is capable of connecting multiple ISDN devices and non-ISDN devices to the NT1 272. Under the BRI configuration, up to eight ISDN devices, TE1s 202 and 222 or TAs 240, 274, 264, and 276, or any combination of eight TE1s and TAs may be connected to a single ISDN line. Each ISDN device is then assigned a terminal endpoint identifier (TEI) so that a logical link may be established between the TEI and the LT/ET 210.

Networks A 200, B 220, C 240, and D 260 represent examples of possible configurations of an ISDN. Other configurations can be implemented without departing from the spirit of the invention.

The ISDN reference points R, S, T, and U are used to define the logical/functional boundaries of the separate elements of ISDN. The reference points are used to define the communication protocols from one ISDN functional element to another ISDN functional element. The first reference point is between the TE2 and the TA. This reference point defines the boundaries of the ISDN zone and the non-ISDN zone. There is no standard for this reference point; the manufacturers are developing their own standards to function with their pre-existing devices.

The second reference point, S, defines the boundary between user's ISDN equipment and the network termination equipment. The S reference point typically is between the ISDN end-user equipment and the PBX, or the company-wide telephone system. The International Telecommunications Union Telecommunications Standard (ITU-T) defines the protocol to be implemented at this boundary. The ITU-T is hereby incorporated by reference. The standard insures that ISDN devices can function with any network termination equipment.

The third reference point, T, defines the boundary between the NT2s (ex NT2 246) and the NT1s (ex NT1 248). The communication protocol between an NT1 and an NT2 is defined in the ITU-T. This is to insure that the end-user with a company-wide telephone system can connect to the telephone company provided network termination equipment.

The last reference point, U, defines the boundary between the NT1 (ex NT1 248) and the LT/ET 210. The ITU-T does not define the standard to be used at this boundary as the ITU includes the NT1 as a functional element of the telephone company. The United States, however, allows for a non-governmental authority to own the NT1s, thus the United States requires the communication protocol through the U point to conform with the standards set by the American National Standards Institute (ANSI). The ANSI standards as applied to an ISDN network are hereby incorporated by reference.

Figure 3:
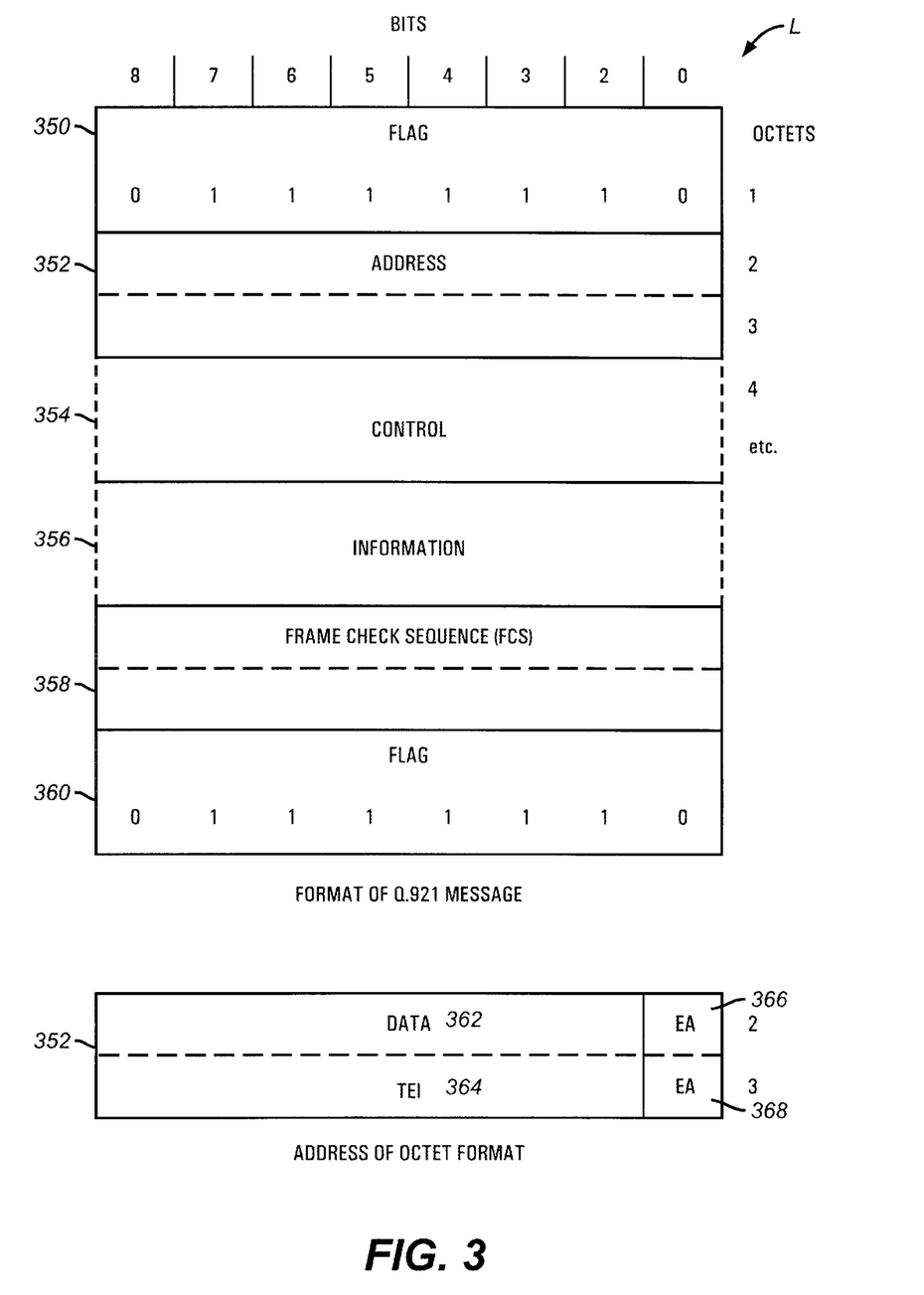
FIG. 3 is a diagram of the generic format of a Q.921 message.

Turning to FIG. 3, the format of a generic Q.921 message is shown. The ITU has recommended the implementation of generic message structure to be used for control and data transmission. A Q.921 message is implemented to make a logical connection between the end-user and the carrier network, LT/ET 210 of FIG. 2. The Q.921 message follows the Link Access Procedures on the D-Channel (LAPD) protocol. The LAPD protocol defines the parameters in which an ISDN device connects with the carrier network. Frame L contains fields that are 8 bits wide. Each field is labeled with an Octet designation. The first field is the Flag field 350. The Flag field contains the binary representation of 7E hexadecimal. This represents the beginning of the frame. The last field, Flag field 360, contains the binary representation of 7E hexadecimal. The second encounter of this field identifies the end of the frame.

The next field, the Address field 352 contains two octets. The Address field 352 contains the called user's identity in the TEI 364 field and internal message configuration data in 362. The TEI 364 can be a value from 0–127. Values 0–126 are used identify a TE1 202 and 222 or a TA 244, 274, 264, and 268 as shown in FIG. 2. Each ISDN device is given this arbitrary value to allow for a logical connection between the network carrier, LT/ET 210 and the ISDN-device over a single ISDN line. However, since several ISDN devices can be connected to a single ISDN line, the network carrier, LT/ET 210, may not be able to make the logical connection. When this occurs, the TEI 364 is set to 127, broadcast. This alerts the ISDN devices on the single line that a message is being sent without a logical connection. The ISDN device then compare the ISDN address embedded within the Q.931 message (see FIG. 4) with a resident ISDN device number. Bit 1 of the octets of the Address field 352 contain the Address field extension bits, EA0 366 and EA1 368. EA0 366 is set to a "0" to indicate that the Address field 352 contains more octets. EA1 368 is set to "1" to indicate that this octet is the last octet of the Address field 352.

The next field is the Control field 354. The Control field 354 contains the type of frame this message represents. Three types of frames can be identified in the Control field 354; information, supervisory, and unnumbered. The Information field 356 is next. The Information field 356 contains lower level messages, including the Q.931 messages (see FIG. 4), user data, and message management data. The next to last field, the Frame Check Sequence (FCS) 358 field contains a portion of the error checking data contained in the ISDN message.

Figure 4:
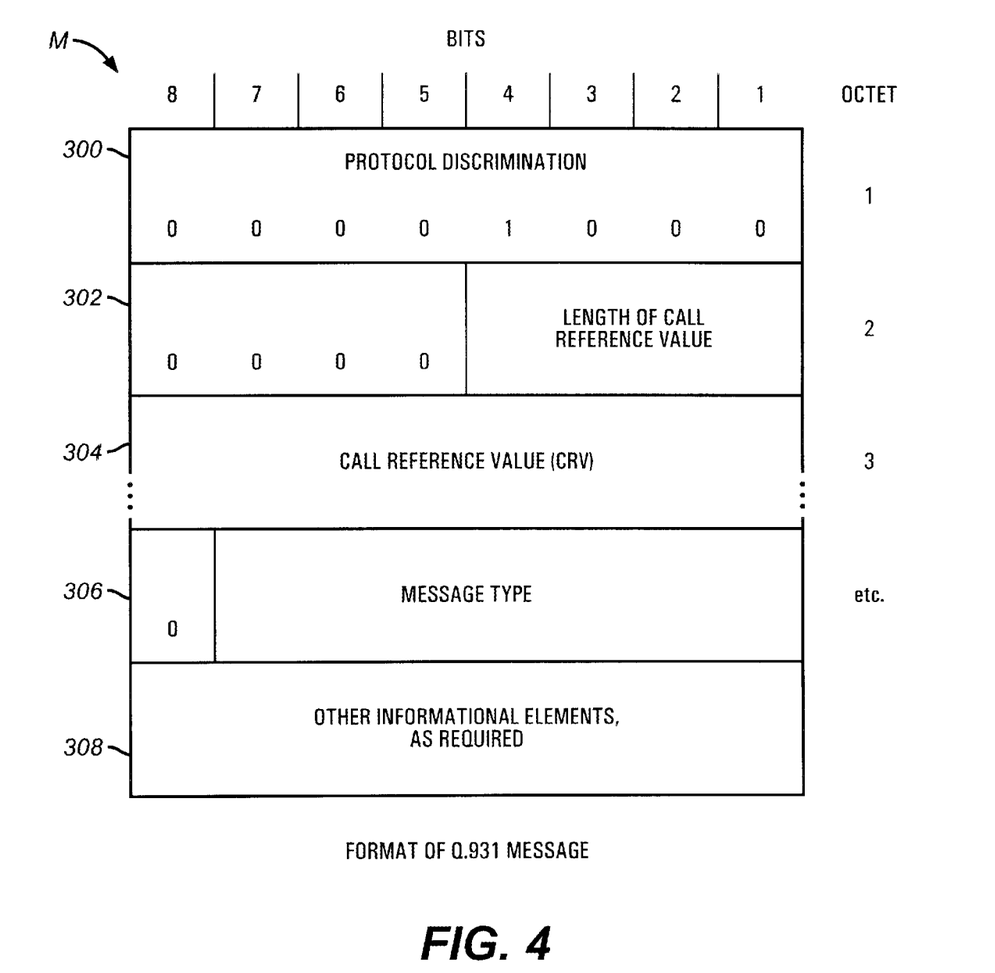
FIG. 4 is a diagram of the generic format of a Q.931 message.

Turning to FIG. 4, the format of a generic Q.931 message is shown. The ITU has recommended the implementation of generic message structure to be used for control and data transmission. The Q.931 message is contained within the Q.921 message, as shown above in FIG. 3. The Q.931 message format is implemented when the message concerns call control. Call control ig defined as the protocol necessary to establish, maintain, and disconnect the call. Message M contains elements eight bit wide. Each element is labeled with an Octet designation. The elements contain the parameters that define the connection and attributes to the connection. The called party examines these parameters to determine whether or not to answer the call. Every message contains a basic subset of elements. The first element, called an octet, contained in all messages is the Protocol Discrimination element 300. The Protocol Discrimination element 300 identifies the protocol implemented by the specific message. This is necessary in that non-ISDN devices implement the Q.931 message format in other technologies. The next octet, or element, is the Call Reference element 304. The Call Reference elements 304 and 302 identify a specific ISDN call, at the local user-network interface, to which this message applies. The Call Reference elements 304 and 302 are values used by the network and the user to identify a call. The Call Reference Value 304 remains constant throughout the call, but has no value outside of the user-network interface. The first Call Reference octet 302 indicates the number of octets which contains the Call Reference Value 304. The Call Reference Value 304 for a communication using the Basic Rate Interface (BRI) is one octet.

The next octet is the Message Type 306. The Message Type identifies the message function. Examples of message types include Setup, Connect, and Disconnect. Q.931 defines twenty-five message types with Q.932 defining 8 more. An advantage of ISDN is that the messages can be constructed to provide a varying amount of information, yet the basic elements for the necessary messages can be intact. A Setup message type contains the necessary parameters to initiate the call setup procedure. The Setup message originates from the calling party and is sent from the network to the called party. Contained within the Setup message is the called party's ISDN device address. The calling party enters the ISDN device address, typically a seven-digit telephone number, into the calling party's ISDN device. The ISDN device embeds the called party's ISDN device address in the Setup message to be sent to the network. The network then forwards this message to the called party's ISDN device which will compare the ISDN device address (entered by the calling party's ISDN device) with the resident ISDN device number.

The next octet is the Other Information element 308. This octet is included, as required, according to what message type is included within the message. The Other Information elements 308 are self-contained, in that the Other Information elements 308 contain their own length indicator along with any necessary data.

Figure 5:
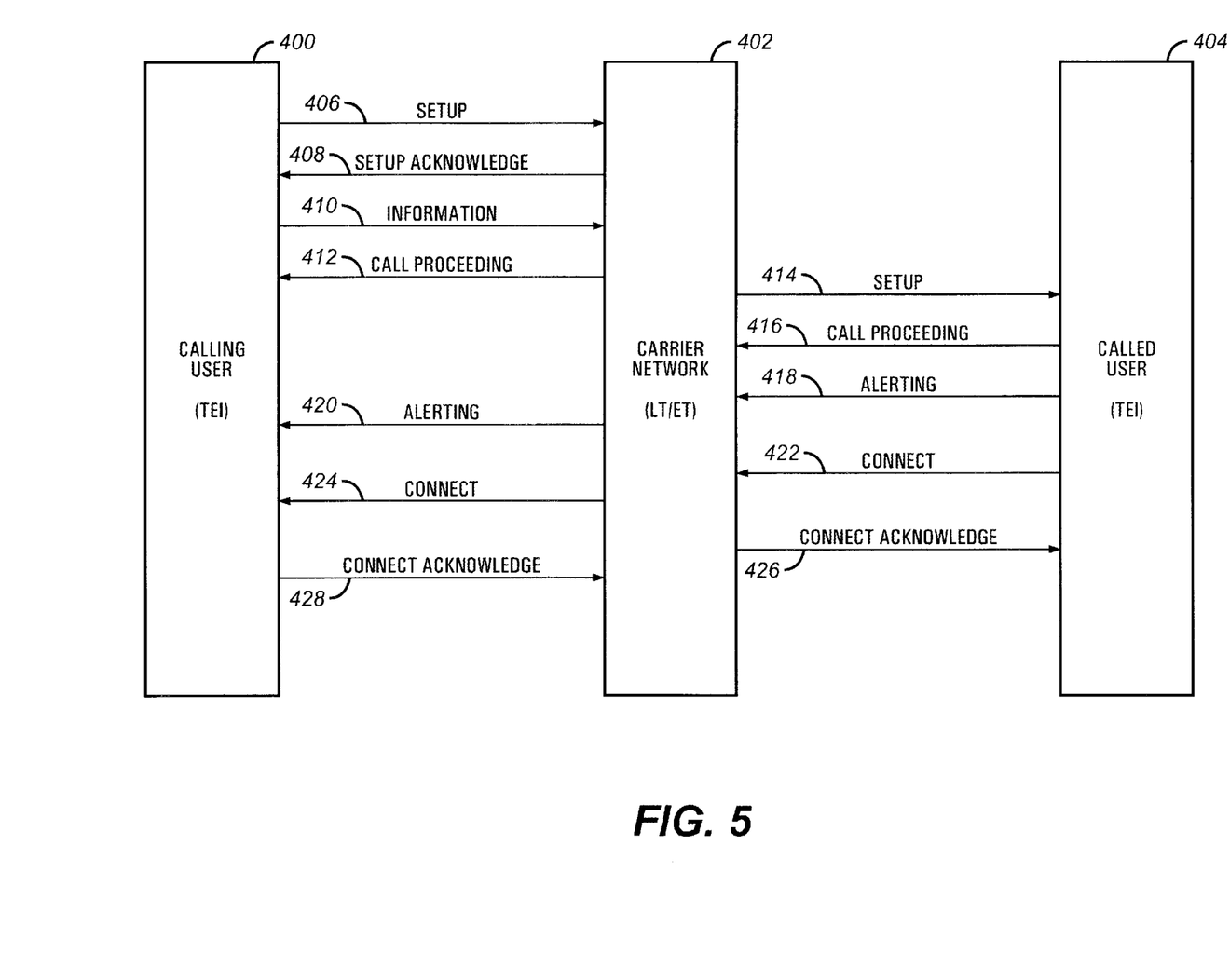
FIG. 5 is a block diagram of the initial handshaking procedures between a calling user and a called user.

Turning now to FIG. 5, the handshaking procedure of an ISDN message is shown. Three parties are involved with handshaking procedure, the calling user 400, the carrier network 402, and the called user 404. The calling user 400 and the called user 404 are ISDN devices. The calling user 400 enters the telephone number of the called user 404. This telephone number is embedded into the ISDN Setup message by the calling user's 404 ISDN device. The entered telephone number is identified as the called party's number and is the ISDN device address. The message is constructed according to the format discussed in FIGS. 3 and 4, and the Setup information is included before the Setup message 406 is sent to the carrier network 402. The carrier network 402 responds to the receipt of the Setup message 406 by sending the Setup Acknowledge message 408 to the calling user 400. Upon receiving the Setup Acknowledge message 408, the calling user 400 sends the Information message 410. The Information message 410 contains specific codes designating the information as speech, data transfer or video. Upon receipt of the Information message 410, the carrier network 402 sends a Call Proceeding message 412 to the calling user 400. Then the carrier network sends the Setup message 414 to the called user 404. The called user 404 examines the message to check the ISDN device address and to see what services are being requested. The called user 404, according to the disclosed invention, compares the ISDN device address with a pre-entered ISDN device number with a right-to-left matching scheme. If the ISDN device address and the ISDN device number match, then the called user 404 responds to the Setup message 414 with the Call Proceeding message 416. The Call Proceeding message is sent to the carrier network 402. The called user 404 then notifies the user that a call is being placed to the called user 404. When the called user 404 makes this notification, an Alerting message 418 is sent to the carrier network 402. The carrier network 402 passes the Alerting message 420 to the calling user 400. When the end-user acknowledges the notice of a call, the called user 404 sends the Connect message 422 to the carrier network 402. The carrier network 402 passes the Connect message 424 to the calling user 400. Once the calling user 400 receives the Connect message 424, the calling user 400 transmits the Connect Acknowledge message 428 to the carrier network 402, which passes the Connect Acknowledge message 426 to the called user 404. This procedure ends with the called user 404 receiving the Connect Acknowledge message 426.

Figure 6:
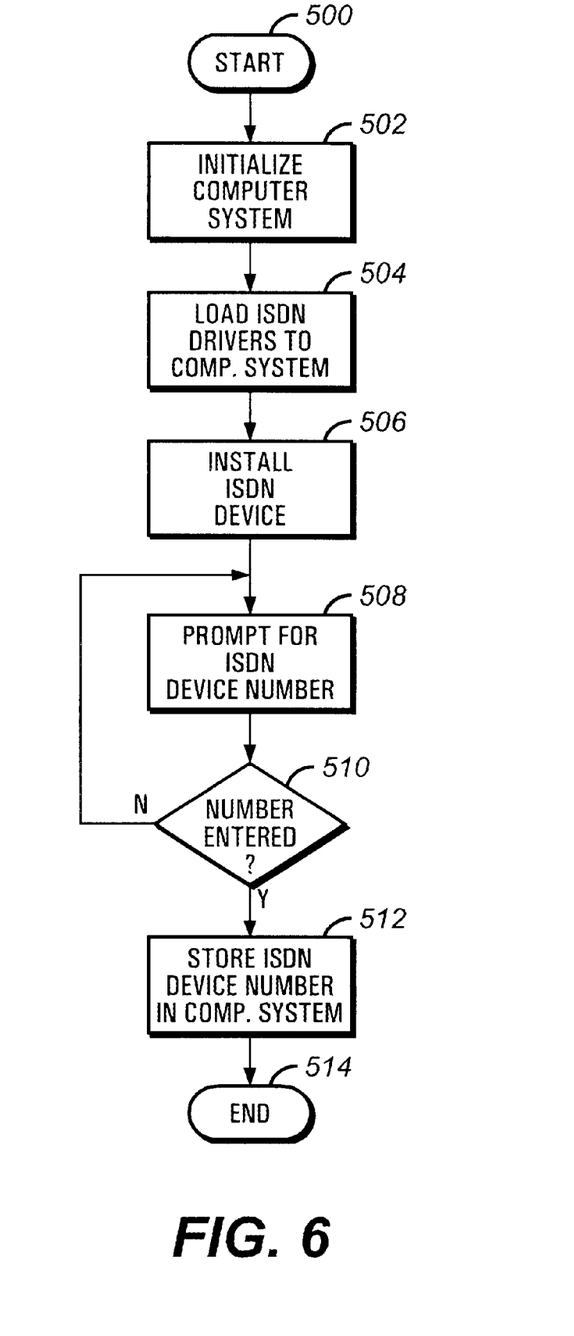
FIG. 6 is a flow chart of the installation procedure for an ISDN device.

Turning now to FIG. 6, a flow chart of the installation process for an ISDN-type device is shown. The process begins with start 500. In step 502, the computer system is initialized typically this is done with a hard or cold boot such as cycling of power. However, the system can be forced into a re-boot mode with a soft or warm boot. Next in step 504, the computer system loads the ISDN drivers from a separate media. In the disclosed embodiment, the drivers are loaded from a CD-ROM 66 drive, however, other media, including disk drives and ATAPI drives could be implemented without departing from the spirit of the invention. The ISDN drivers are executed by the processor to allow for communication between the computer system and the ISDN device. The ISDN drivers also provide the configuration parameters in which the ISDN device runs. Next in step 506, the ISDN device is installed. The installation of the ISDN device occurs the first time the computer system acknowledges the physical presence of the ISDN device within the computer system. During the installation process, the parameters within which the ISDN device runs are established. One of the parameters that are used to establish the configuration of the ISDN device is shown in step 508. When the computer system prompts the user for the ISDN device number, typically the telephone number given to the user by the local telephone company is entered as the ISDN device number. Generally the user enters the 10-digit telephone number, including the area code, as the ISDN number. After the computer system prompts for the ISDN device number in step 508 the computer system determines whether a number has been entered in step 510. If a number has not been entered, the computer system continues to prompt for the ISND device number in step 508. If a number has been entered in step 510, the computer system proceeds to step 512 where the ISDN device number is stored within the computer system. The ISDN device number is combined with the existing ISDN drivers to define the total parameters for the configuration in which the ISDN device runs. The process ends with step 514.

Figure 7A:
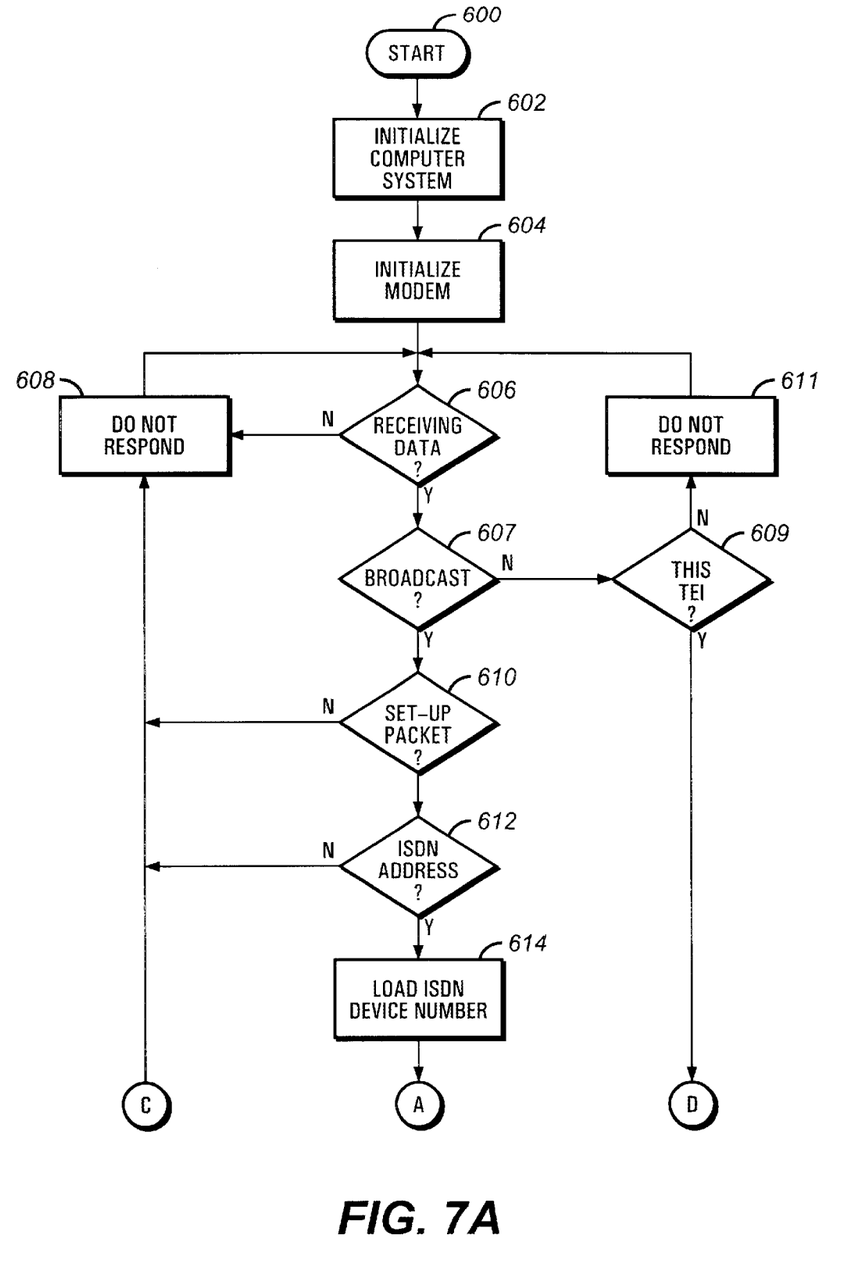
FIGS. 7A–7C are flow charts of the matching procedure according to the present invention.

Turning now to FIG. 7 the process for matching an ISDN device number with the ISDN device address is shown. The process begins on FIG. 7A with step 600. In step 602 the computer system is initialized. Next in step 604, the modem is initialized. The modem of the disclosed embodiment is an ISDN device configured to use the basic rate interface (BRI) protocol. Next in step 606, the computer system determines if the ISDN modem is receiving data, if modem is not receiving any data, the computer system does not respond in step 608. If the ISDN device is receiving data the computer system determines if the message is a broadcast message (see FIG. 3) in step 607. If the message is not a broadcast message, the computer system determines if the message contains the ISDN device's TEI (see FIG. 3) in step 609. If the non-broadcast message identifies another ISDN device, the process continues with step 611, directing the computer system to not respond to the message. The process continues with step 606 to determine if the ISDN device is receiving data. If the message is intended for the ISDN device, through the correct TEI, the computer system responds to the message in step 628.

If the message is a broadcast message, as determined in step 607, the computer system determines if a setup packet is contained in the data received in step 610. If there is no setup packet in the data received, the process continues to step 608 where no response is given. If there is a setup packet contained in the data received, the process continues with step 612 in which the computer system determines if an ISDN device address is contained within the setup packet if there is no ISDN device address in the set up packet, the process continues to step 608 where the computer system does not respond to the receiving of data if there is an ISDN device address in the setup packet, the computer system proceeds to step 614 where the computer system loads the ISDN device number stored within the computer system. The ISDN device number has been entered been the ISDN device was installed originally as discussed in FIG. 6. Once the ISDN device number has been loaded, the process continues on FIG. 7B with step 616.

Figure 7B:
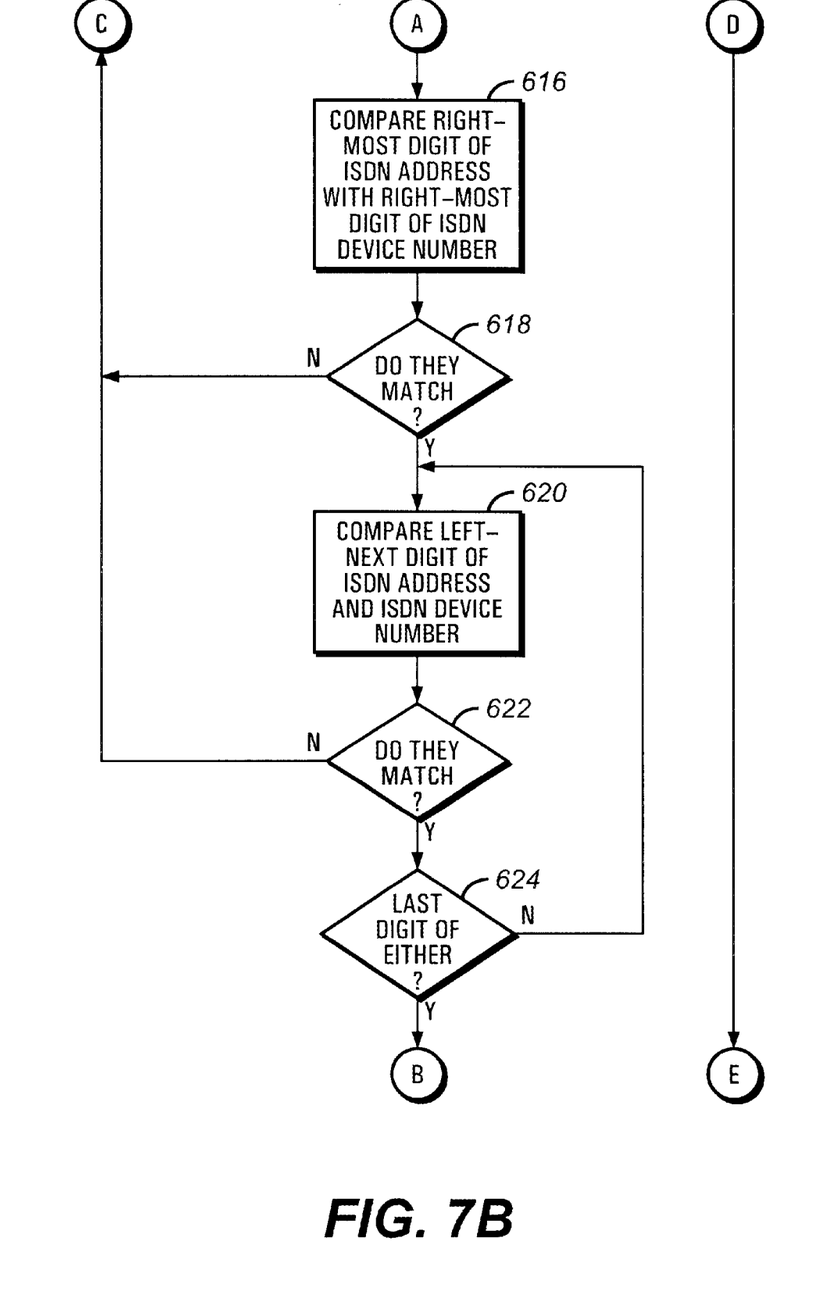

In step 616 the computer system compares the right most digit of the ISDN device address with the right most digit of the ISDN device number. Next, in step 618, the computer system determines if the right most digits of the ISDN device address and the right most digit of the ISDN device number match. If they do not match the process continues with step 608 and the computer system does not respond to the received data if the right most digits do match the process continues with step 620. In step 620 the computer system compares the left next digit of the ISDN device address and the ISDN device number. Proceeding to step 622 the computer system determines if these digits match. If these digits do not match, the computer system proceeds with step 608 and does not respond to the incoming data. If the left next digits of the ISDN device address and the ISDN device number do match the process continues with step 624 where the computer system determines if these were the last digits of either the ISDN device address or the ISDN device number. If this was not the last digit of either the ISDN address or the ISDN device number the process returns to step 620 and the next left next digit of the ISDN address and the ISDN device number are compared. If the compared digit was the last digit of the ISDN device address or the ISDN device number, the process continues to FIG. 7C with step 626.

Figure 7C:
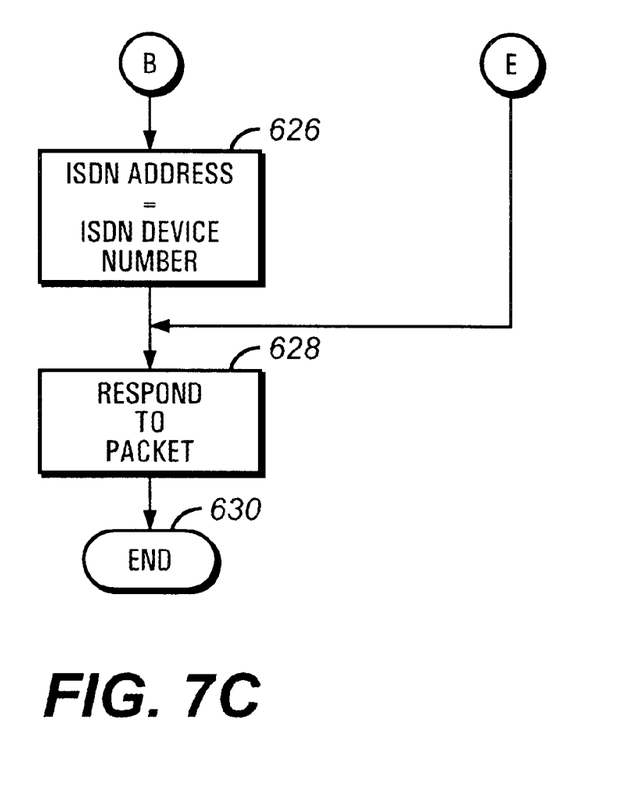

In step 626 the ISDN device address is determined to equal the ISDN device number. When the ISDN device address and the ISDN device number are equal, this alerts the computer system that the received data and incoming message is directed at this computer system. Next in step 628, the computer system responds to the message received in step 606. The process ends at step 630.

Figure 8:
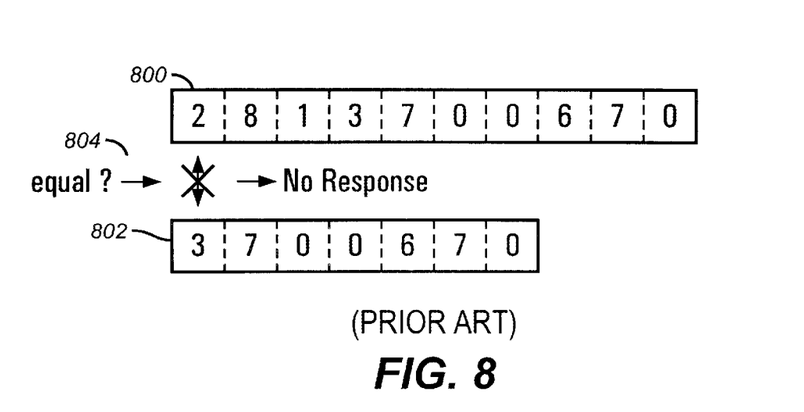
FIG. 8 is a diagram of the comparing function as known in the prior art.

Turning now to FIG. 8, a diagram of the comparing function as known in the prior art is shown. Prior to the disclosed invention, a computer system would compare an ISDN device address 802 with the resident ISDN device number 800. The comparison would begin with the left-most digits of the ISDN device address 402 and the resident ISDN device number 800. The computer system would compare 804 the digits without regard to the area codes. When this occurs, the computer system determines that the ISDN device address 802 and the ISDN device number 800 are not equal. However, the ISDN device address 802 and the ISDN device number 800 do represent the same ISDN device, one just includes the area code.

Figure 9:
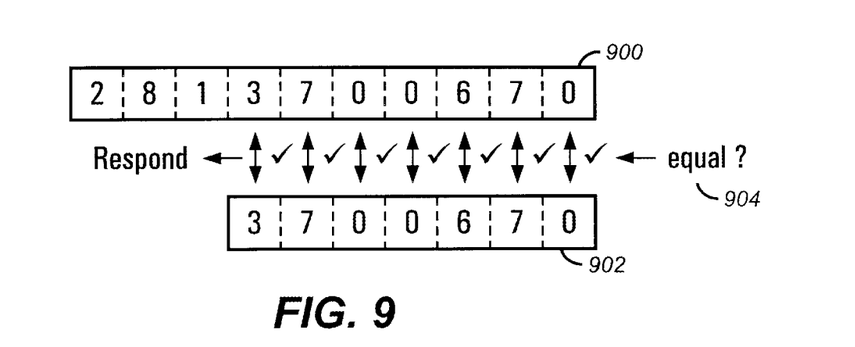
FIG. 9 is a diagram of the comparing function as disclosed by the present invention.

Turning now to FIG. 9, a diagram of the comparing function according to the disclosed invention is shown. The ISDN device address 902 is compared with the resident ISDN device number 900 implementing right-to-left matching. The computer system compares 904 the right-most digits of the ISDN device address 902 and the ISDN device number 900. When these digits match, the left-next digits are compared. This process is continued until the left-most digit of either the ISDN device address 902 or the ISDN device number 900 is encountered. If the left-most digit is encountered, the comparison ceases and the digits are a match. This match occurs even though the area code is used in the ISDN device number 900.

The computer system compares the ISDN device address received through the ISDN-type device with a pre-existing ISDN device number, which was determined when the ISDN device was installed, in a right to left matching scheme. If there is a match, the computer system will respond to the ISDN message.

The foregoing disclosure and description of the invention are illustrative and explanatory thereof and various changes to the size, shape, materials, components, circuit elements, wiring connection and context, as well as in the details of the illustrated circuitry and construction and method of operation may be made without departing from the spirit of the invention.

What is claimed is:

1. A method to match address numbers contained in a Integrated Services Digital Network (ISDN)-type set-up packet with a resident number of a computer system having an ISDN-type data communication device, the method comprising the steps of:

receiving data through the data communication device, wherein the data includes the ISDN-type set-up packet data having a destination device address number;

comparing the address number with the resident number from right digit to left digit until the left-most digit of one of the numbers is compared or until a compared digit does not match; and responding affirmatively to the ISDN-type set-up packet, via the ISDN-type data communication device, if all of the compared digits matched, by transmitting data from the data communication device; else if the compared digit does not match, the data communication device does not transmit data.

2. The method of claim 1, further comprising the steps of:

in response to receiving data through the ISDN-type data communication device, verifying the set-up packet contains an address number; and in response to verifying that the set-up packet contains an address number, comparing the address number with the resident number from right digit to left digit until the left-most digit of one of the number is compared or until a compared digit does not match.

3. The method of claim 1, wherein the step of receiving data through the ISDN-type data communication device includes receiving Basic Rate Interface (BRI) formatted data through the ISDN-BRI data communications device.

4. The method of claim 1, wherein the step of comparing the address number with the resident number includes comparing the address number with the resident number, the resident number corresponding to an area code plus the telephone number assigned by the local telephone service provider.

5. The method of claim 1, wherein the step of comparing the address number with the resident number includes comparing the address number with the resident number, the address number corresponding to the telephone number assigned by the local telephone service provider without an area code.

6. The method of claim 1, wherein the setup packet data includes a flag representing a broadcast message or a logical connection message, and the step of comparing the address number only occurs when the flag represents a broadcast message.

7. A computer system adapted to compare address numbers received in an ISDN-type set-up packet with a resident number, the computer system comprising:

a processor a mass storage subsystem coupled to the processor, the mass storage subsystem for storing device driver code;

an ISDN-type data communication device coupled to the processor, the ISDN-type data communication device for attaching to an external interface; and ISDN-type data communication device driver code residing in the mass storage subsystem, the ISDN-type data communication device driver code, when executed, causing the processor to perform the steps of:

receiving data through the data communication device, wherein the data includes the ISDN-type set-up packet data having a destination device address number;

comparing the address number with the resident number from right digit to left digit until the left-most digit of one of the numbers is compared or until a compared digit does not match; and responding affirmatively to the ISDN-type set-up packet, via the ISDN-type data communication device, if all of the compared digits matched, by transmitting data from the data communication device; else if the compared digit does not match, the data communication device does not transmit data.

8. The computer system of claim 7, further comprising the steps of:

in response to receiving data through the ISDN-type data communication device, verifying that the set-up packet contains an address number; and in response to verifying the set-up packet contains an address number, comparing the address number with the resident number from right digit to left digit until the left-most digit of one of the number is compared or until a compared digit does not match.

9. The computer system of claim 7, wherein the ISDN-type data communication device includes an ISDN-Basic Rate Interface data communications device.

10. The computer system of claim 7, wherein the step of comparing the address number with the resident number includes comparing the address number with the resident number, the resident number corresponding to an area code plus the telephone number assigned by the local telephone service provider.

11. The computer system of claim 7, wherein the step of comparing the address number with the resident number includes comparing the address number with the resident number, the address number corresponding to the telephone number assigned by the local telephone service provider without an area code.

12. The computer system of claim 7, wherein the setup packet data includes a flag representing a broadcast message or a logical connection message, and the step of comparing the address number only occurs when the flag represents a broadcast message.

13. A system adapted to compare address numbers received in an ISDN-type set-up packet with a resident number for use with a processor, the system comprising:

an ISDN-type data communication device, the ISDN-type data communication device for attaching to an external interface; and ISDN-type data communication device driver code controlling the ISDN-type data communication device, the ISDN-type data communication device driver code, when executed, causing the processor to perform the steps of:

receiving data through the data communication device, wherein the data includes the ISDN-type set-up packet data having a destination device address number;

comparing the address number with the resident number from right digit to left digit until the left-most digit of one of the numbers is compared or until a compared digit does not match; and responding affirmatively to the ISDN-type set-up packet, via the ISDN-type data communication device, if all of the compared digits matched, by transmitting data from the data communication device; else if the compared digit does not match, the data communication device does not transmit data.

14. The system of claim 13, further comprising the steps of:

in response to receiving data through the ISDN-type data communication device, verifying that the set-up packet contains an address number; and in response to verifying the set-up packet contains an address number, comparing the address number with the resident number from right digit to left digit until the left-most digit of one of the number is compared or until a compared digit does not match.

15. The system of claim 13, wherein the ISDN-type data communication device includes an ISDN-Basic Rate Interface data communications device.

16. The system of claim 13, wherein the step of comparing the address number with the resident number includes comparing the address number with the resident number, the resident number corresponding to an area code plus the telephone number assigned by the local telephone service provider.

17. The system of claim 13, wherein the step of comparing the address number with the resident number includes comparing the address number with the resident number, the address number corresponding to the telephone number assigned by the local telephone service provider without an area code.

18. The system of claim 13, wherein the setup packet data includes a flag representing a broadcast message or a logical connection message, and the step of comparing the address number only occurs when the flag represents a broadcast message.

* * * * *